Figure 1:
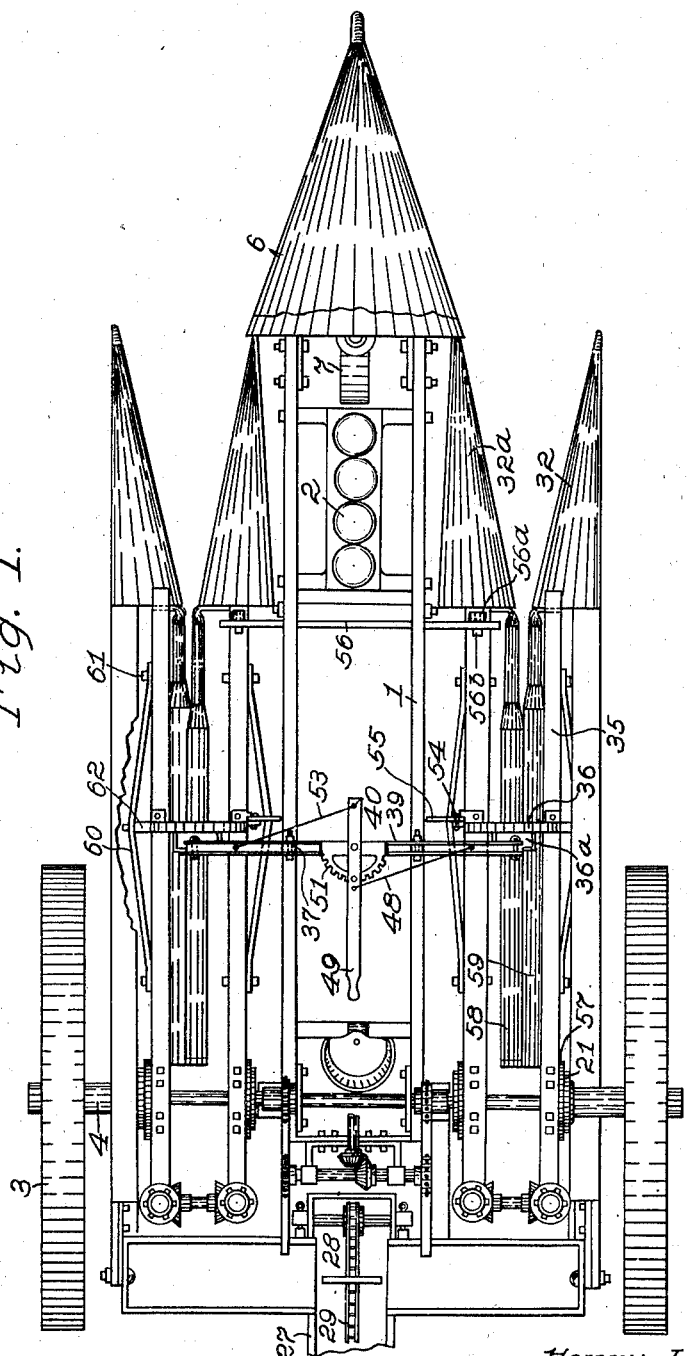

Dec. 6, 1938.   H. J. KUHLMAN   2,139,165
CORN HARVESTER
Filed April 1, 1937   2 Sheets-Sheet 1

Inventor
Henry J. Kuhlman, by
G. C. Kennedy
Attorney

Dec. 6, 1938.  H. J. KUHLMAN  2,139,165
CORN HARVESTER
Filed April 1, 1937   2 Sheets-Sheet 2
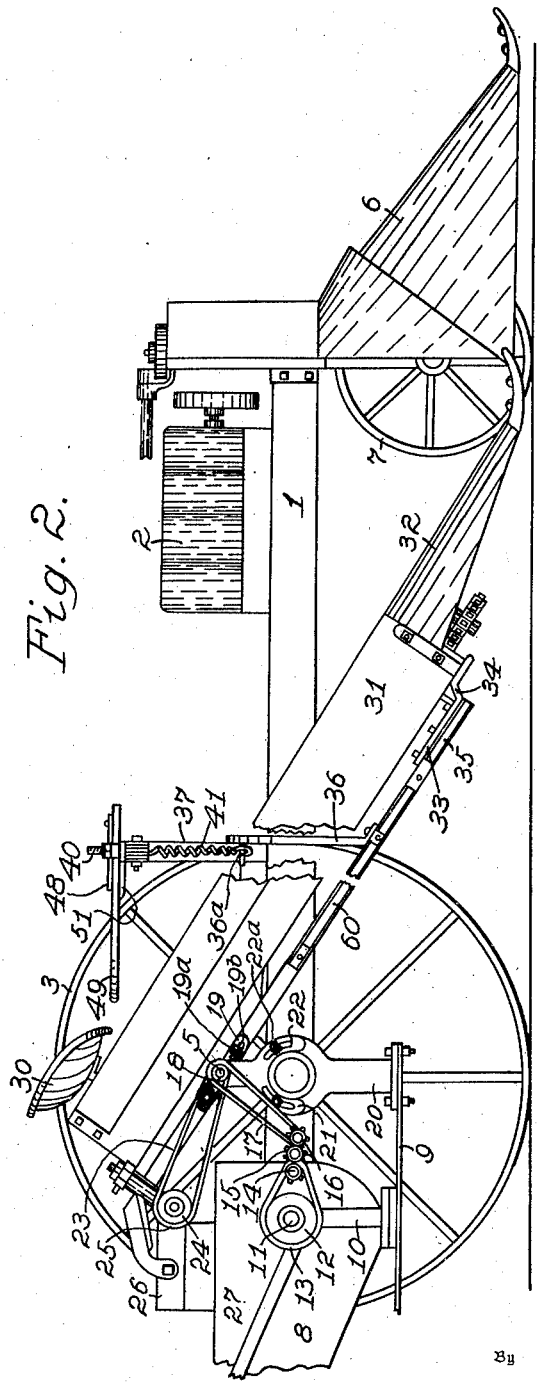
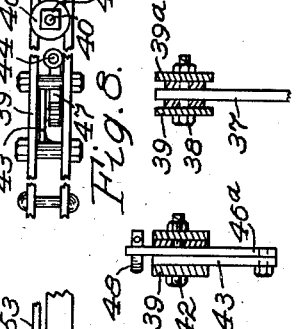
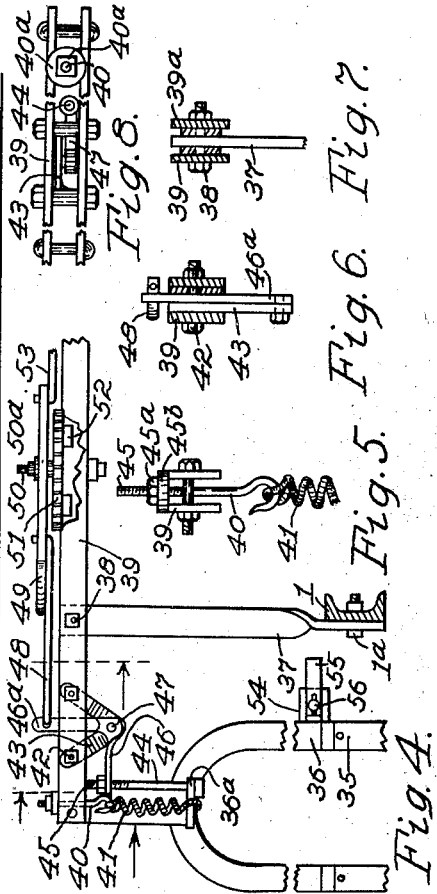
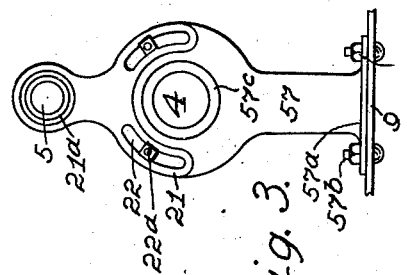
Inventor
Henry J. Kuhlman,
By
Attorney Patented Dec. 6, 1938

2,139,165

UNITED STATES PATENT OFFICE 2,139,165

CORN HARVESTER

Henry J. Kuhlman, Waterloo, Iowa, assignor to Kuhlman Manufacturing Company, Waterloo, Iowa, a corporation of Iowa Application April 1, 1937, Serial No. 134,249

16 Claims. (Cl. 56—18)

My invention relates to improvements in corn harvesters, and particularly to new and useful improvements in the structural embodiments thereof to effect improved relations in the respective elements and mechanisms thereof for diverse purposes and utilities.

One improvement consists in the relative arrangements for coaction of a tractor and a single one or a pair of harvesters associated therewith.

Another improvement lies in the provision of means for supporting a harvester or harvesters in the last mentioned relation substantially medially and adjustably resiliently for perfecting its balance, and for lessening the vertical scope of movements of the delivery part thereof, and including a pivotal support therefor located near the rear end thereof.

Another improvement consists in furnishing manually operable means for swinging up or down the forward part of each harvester or harvester, singly, or together, adjustably.

Another improvement lies in providing adjustable means for supporting such forward part of a harvester for limited play vertically as so resiliently mounted.

Another improvement is to provide means for adjusting said pivotal support.

Another improvement is to furnish spaced frame bars for each of a pair of harvesters as positioned and connected to a tractor located therebetween, the frame bars having trussed stiffening elements as rigid connections therebetween as associated in each case with rigid arches across and secured to the frame bars, for stability and preventing torsion and looseness in their joints.

Another improvement is to adjustably rigidly connect the forward portions of the harvester frames beneath the tractor frame to retain said harvester frames in related operative positions.

Another improvement is to provide on the innermost frame bars of each pair adjustable stop means adjacent to the abutting frame members of the intermediate tractor, to keep each of a pair of harvesters in parallel relation to the tractor.

The above improvements have been successfully achieved in actual constructions and operation, and by the means and mechanisms which are hereinafter fully described and claimed.

It is to be however understood that various modifications in the details of construction and arrangement of parts of the above apparatus and its connections and relations may be made without departure from the respective inventions herein and as defined in the claims.

Referring to the appended drawings, Fig. 1 is a top plan of an intermediate tractor shown in diagrammatic form, with like harvesters operatively connected to opposite parts thereof, with parts of each broken away or removed. Fig. 2 is a side elevation of a harvester mounted on and alongside the tractor, with portions of both intermediately broken away. Fig. 3 is an enlarged side elevation of one of the outer fixed pivotal supports of a harvester. Fig. 4 is a rear elevation of the left-hand parts of the manually operable limitedly acting and resilient supporting or suspending means for and linked to one of the transverse frame arches of a harvester relative to the supporting means therefor on and across the tractor frame, with parts broken away or in transverse section. Fig. 5 is a detail end view of the parallel bars of the tractor support with the adjustable connections thereof to the depending resilient connection to a harvester frame arch, and also showing the adjustable spacing stop means on the arch for the tractor frame. Fig. 6 is a similar but sectional view of said parallel bars, showing as movably mounted therebetween and thereon the adjustable linking means at one side and between the manually operable means for supporting for limited play the arch and frame of one harvester, other parts being broken away. Fig. 7 is a similar and sectional view of said parallel bars showing them connected to and inclosing the upper part of a standard rigidly mounted on the tractor frame, as shown also in Figs. 1 and 2. Fig. 8 is a fragmentary top plan of portions of asid parallel bars, showing the respective mountings of the adjustably rigid and the adjustable resilient supporting means for the said arch.

The drawings display a pair of like harvesters supported operatively at and on opposite parts of an intermediate tractor, but it is to be understood that in principle the inventions herein are also useful and likewise adaptable for the propulsion and operation of a single harvester as related to a tractor.

In Fig. 1 are shown like corn harvester mounted on opposite parts of an intermeidate tractor. The tractor includes spaced parallel side frame bars 1, rigidly connected, at opposite sides of an engine 2 and a preceding prow 6. The rear portions of these side bars are connected by various cross connections as shown in Fig. 1.

As shown, the forward part of the tractor is supported on a rockable steering wheel 7, and at the rear on a transverse axle 4 carrying the wheels 3, and the end parts of the axle 4 are mounted in bearings in standards 20 having depending parts connected to and supporting rigidly rear side bars 9 upon which are mounted posts 10 having top shafts 11 carrying belt-wheels 12. The wheels 12 are by belts 13 connected to small belt-wheels in advance not shown, whose shafts carry outer spur-gears 14 meshed with other spur-gears 15, which in turn mesh with other and forward spur-gears 16, the latter carrying small belt-wheels, not shown, on shafts mounted on the tractor frame 1, and a belt 17 on each of the latter belt-wheels is mounted on a belt-wheel 18 on each of the outer ends of a positively rotated shaft 5 which is driven by means of connections to the engine 2, not shown. Belt-wheels on the ends of the shaft 5 also carry the forward ends of belts 23 on the wheels 24 whose shaft 25 drives a sprocket-wheel 28, by connections not shown, and driving also a sprocket chain 29 with transverse push-bars thereon, in the delivery chute 8 beneath the hopper 27 and side chutes 26 which deliver husked corn ears into the hopper and chute 8 to transfer the ears to a following wagon or other device. The above devices entrained from the power shaft 5 to the rear sprocket-chain in the chute 8, are not claimed herein, hence will not be otherwise or further described. Also, referring to Fig. 1, each harvester carries a coacting pair 58 and 59 of husking rolls, not included in this application specifically.

Each harvester carries a front prow or fender 32 at one side, and an opposite but reversed one 32a at the opposite side and supported on the side bars 35, and in advance of the pairs of rolls 58 and 59, to receive between them and direct stalks of corn in a row at each side and in alinement between the rolls and their forward cylindrical extensions.

In all the figures, except Fig. 3, are shown parts of the means and devices for supporting the pair of harvesters upon the tractor These means include medial transverse arches 36, shown in Figs. 1, 2 and 4 particularly, whose bent end parts are bolted rigidly to the frame bars 35. These arches are strong castings and each of them has on its inner edge a projection with a longitudinal groove or seat between flanges 54 seating adjustably therein a stop-bar 55, the projection having a bolt-hole and stop-bar having a longitudinal slot, whereby a traversing bolt 56 may secure the stop-bar in an adjusted position relative to the abutting outer frame-bar 1 of the tractor to nearly touch it, to prevent lateral swaying of the harvesters relative to the tractor. This retains the harvesters in a desired spacing limit or limits, to aline them properly to receive stalks in corn rows of hills of a predetermined spacing apart.

The arches 36 each have on one face a medial lug 36a orificed for connection to the lower end of a coiled tension spring 41 whose upper end is engaged with a depending hook 40 whose upper threaded end has thereon an adjusting nut 45a (see Fig. 5), with an intermediate washer 45b engaging the upper edges of the parallel bars 39. By this means, each harvester is adjustably resiliently suspended on the fixed parallel bars 39 on the tractor.

The parallel bars 39 are fixedly mounted on and inclosing the pair of standards 37 at their upper ends and secured by bolts 38 traversing the bars and intervening washers 39a as shown in Fig. 7. As shown in Fig. 4, the lower ends of the standards 37 are twisted ninety degrees and secured by bolts 1a to the tractor frame bars 1.

In Fig. 4 are shown means for adjustably limiting the scope of upward and downward movements of the arches 36 and the harvesters. A semicircular rack 51 is mounted fixedly on the middle parts of the parallel bars 39 to project horizontally rearwardly, has depending lugs 52 seated between the bars 39 to prevent rocking of the rack. This rack has a forward cross part 51 apertured to seat a bolt 50 carrying an adjusting nut 50a bearing upon a washer which engages the upper face of a hand-lever or arm 49 which in its middle position projects conveniently near to the driver's seat 30. This arm 49 is in position upon a washer or ring on the rack, and thus the nut 50a may be turned to force the arm into a sufficiently frictional contact with the washer below to normally keep the arm with its fixed detent 49a engaged with teeth of the rack, but the arm may have resiliency enough to permit it to be sprung upwardly to become disengaged with the rack teeth and then engaged with other teeth when swung laterally in either of opposite directions.

Referring now to Figs. 4, 6 and 8, the numeral 43 denotes a V-shaped depending bracket secured by bolts 42 to and between the bars 39, and its parts may be offset forwardly as shown in Fig. 4 if desired to give clearance past it of a bell-crank lever 43, the angle of the lever being pivoted to said bracket at the angle of the latter by a bolt 47. The lower part 46 of the lever is apertured to receive therethrough a terminally threaded upper termination of a vertically depending headed rod 44 which also traverses an aperture in said bracket or lug 36a, a nut 45 on the upper end part of the rod 44 serving to adjust the position of the rod vertically to more or less limit the movements of the arch 36 up or down as supported suspensively resiliently on the depending spring 41. The vertical part of said bell-crank lever at 46a is connected by a rod 48 with the swingable arm 49. A similar rod 53 on the opposite end of the arm 49 is (see Fig. 1) end-connected with a like bell-crank lever 46a, 46, whereby, when the arm 49 is swung in one direction laterally, said linking connections to the arches 36 lower the harvesters, and an opposite swinging lifts the harvesters.

It should be noticed, that the forward parts of the two harvesters are both resiliently supported only, by means of the springs 41, the depending rods 44 being supported on the parallel bars 39 and standards 37 fixed on the tractor side bars 1, and the rods 44 serving only to adjustably limit the downward movements of the harvesters as desired, only. The adjusting nut 40a on each rod 44 also serves to permit of adjusting either harvester separately from the other if necessary, or to cause them to be at the same determined level relative to the surface of ground traversed. As the forward parts of the harvesters are solely resiliently suspended on the adjustably mounted springs 41, and the driver may by manipulating the lever or arm 49 lift or lower the harvesters, according to the engagement of the lever detent 49a between any pair of teeth on the rack 51, he can govern the relation of the harvesters in variation of their prows 32 from the ground as may be necessary.

Referring to said Figs. 1 and 3, the fixed standard 57 on the outer side of each harvester has a plate 21 mounted upon it for limited rotatable adjustments thereon, in likewise shifting the driving shaft 5 for the roll mechanisms, and which also somewhat adjusts the forward and rear adjustments of the harvesters as supported on the shaft 5 and on the standards 57. Each plate 21 has depending parts which have like slots 22 concentric with the axle 4, and the slots are traversed by bolts 22a fixed through boltholes in the upper part of the standard 57, and whereby the plates 21 may be separately or together adjusted to likewise adjust the positions of the harvester frames forward or rearward at times.

It should be noted, that as shown in Fig. 1, truss-rods 60 have their ends secured to the outer faces of the harvester frame bars 35, bent medially to span a spacing block 62 on the bar in each case and also thus spanning the arches 36, rendering the connections of the bars and the arches rigid, as against any displacements due to the operations of the rolls 58 and 59. The frames are rendered rigid while under the stresses of severe duty. The frames preferably have the side plates as at 31, supported on end standards.

I claim:

1. In combination in a corn harvester, laterally spaced frame bars, a rigid transverse arch member connected to and across said frame bars, truss-blocks mounted on the outer walls of the frame bars in transverse alinement with said arch member, truss-rods crossing and bearing medially upon said truss-blocks and end-connected to the frame bars, means for resiliently suspending said arch member, and other means for adjustably limiting the scope of movements vertically of the resilient means arch member and frame bars.

2. In combination, a tractor having spaced frame bars, a harvester having spaced frame bars and positioned alongside the tractor, the rear part of the harvester frame bars being pivotally mounted on the tractor frame bars, a rigid bracket on the tractor, a resilient device supported dependingly upon the tractor bracket and linked to the harvester frame bars, means connected between the tractor bracket and of the harvester frame respectively and manually operable for adjustably limiting the vertical movements of the resilient device and harvester frame bars, and an adjustable contact-device on the inner frame bar of the harvester to stop lateral shifting of the harvester frame bars relative to the tractor frame bars.

3. In combination, a tractor, like corn harvesters positioned alongside opposite sides of the tractor, the tractor having rigid spaced frame bars mounted for transportation, the harvesters having rigid spaced frame bars having arch connections therebetween and mounted near their rear ends pivotally upon the tractor frame bars, resilient means bracketed on the tractor and connected to said arches of the harvesters, means movably manually operably adjustably linked between the arches and the tractor and said arches for limiting the vertical movements of the resilient means and also of the harvesters, and the arch connections between the harvester frame bars being rigidly mounted thereon to prevent torsional movements.

4. In combination, a tractor, like corn harvesters positioned alongside opposite sides of the tractor, the tractor having rigid spaced frame bars mounted for transportation, the harvesters having rigid spaced frame bars mounted near their rear ends for vertical swinging pivotally upon the tractor frame bars, rigid brackets on the tractor, adjustably tensionable resilient means suspended from the tractor brackets and connected to medial parts of the harvester, means movably mounted upon said brackets, manually linked devices operable and connected loosely between the bracketing means and harvester frame bars and adjustably supported on the brackets for limited loose connections with the harvesters and for adjustably varying the tension of the resilient means, and cross-bars below the tractor frame connected between forward parts of the harvester frame bars adjustably for each harvester, for keeping the said bars in parallel relation.

5. In combination, a tractor, like corn harvesters positioned alongside opposite sides of the tractor, the harvesters being pivoted near their rear ends upon the tractor, medial resilient suspending means supported on the tractor and connected adjustably and suspensively with medial parts of the harvesters, other means manually mounted on the tractor for like coactions with and movably linked to the harvesters and for loosely limitedly suspending the harvesters for adjusting their vertical movements in unison, like bars adjustably connected between the forward ends of the inner frame bars of the harvesters, and stop-fingers slidably adjustably mounted on medial inner frame bars of the harvesters to space them from the outer sides of the tractor.

6. In combination, a wheeled tractor, a pair of corn harvesters positioned at opposite sides of the tractor, coacting mechanisms on the tractor and the harvesters for treating alined rows of corn stalks and their ears, spaced transverse standards fixed on the tractor and connected by a cross-beam, rigid arches mounted on the harvester frame parts across said harvester mechanisms, resilient hangers between the cross-beam and said arches respectively, and movably connected hanger elements between the cross-beam and said arches, adapted for manual adjustments releasably lockingly with the beam for adjustably limiting the scope of extension of the resilient hangers to support the forward parts of the harvesters at different heights above the surface traversed by the tractor and harvesters.

7. In combination, a wheeled tractor, a harvester mounted thereon laterally, and at its rear part adjustable inclinedly forwardly vertically, and a standard projecting upwardly fixedly from the tractor frame near its rear end, the tractor axle rotatably mounted on the standard, and a bearing body above the axle having its lower part rockably mounted upon the standard and about the axle and adjustably secured to the standard, the upper part of said body having a pivotal connection with the rear part of the harvester frame and for longitudinal adjustments of said frame relative thereto and for vertical adjustments of the rear part of the frame relative thereto.

8. In combination, a tractor, a pair of corn harvester frames positioned at opposite sides of the tractor, and having their rear parts rockably mounted on the tractor, rigid transverse arches secured across opposite parts of the harvester frames to span mechanisms on the frames for treating rows of corn bearing ears, a beam fixed transversely upon the tractor having its ends above said arches, resilient devices connected between said beam and said arches under adjustable tension, bell-crank rockably mounted on said beam and having adjustable slidable connecting means to the arches for limiting adjustably the tension of the springs respectively, a dentated rack fixed medially on said beam, a hand lever pivoted intermediate its ends to the beam and having manually operable resiliently controlled catches to engage any teeth on the rack, and linking connections between an end and a medial part of the lever connected respectively to said bell-crank levers, actuable to adjustably support the frames.

9. In a corn harvester, in combination, a main frame mounted for transportation, including a swingable connection between and closely adjacent to the rear end of the main frame and a harvester frame mounted thereon, consisting of a standard supported fixedly on the main frame, and a connecting member connected to and between the standard and the harvester frame for longitudinal adjustments of the latter, and a spring hanger hung on the main frame and connected at its lower end to a medial part of the harvester frame.

10. In a corn harvester, in combination, a main frame mounted for transportation, a harvester frame mounted tiltably and for longitudinal adjustments upon and closely adjacent the rear end on the main frame, consisting of a standard supported fixedly on the main frame, and a connecting member connected to and between the standard and the harvester frame for longitudinal adjustments of the latter, and a spring hanger hung on the main frame and also at its lower end connected to a medial part of the harvester frame.

11. In a corn harvester, in combination, a main frame mounted for transportation, a harvester frame mounted tiltably closely adjacent its rear end on the main frame, consisting of a standard supported fixedly on the main frame, and a connecting member connected to and between the standard and the harvester frame for longitudinal adjustments of the latter, a spring hanger hung on the main frame and also connected to a medial part of the harvester frame in advance of its said tiltable mounting, including a manually operable stop device connected to said medial portion of the harvester frame and rockable on the main frame and including a stop arm adjustable relative to and connected to the lower end of said hanger for limiting the vertical downward movements of the harvester frame relative to the main frame.

12. In a corn harvester, in combination, a main frame mounted for transportation, a harvester frame mounted closely adjacent its rear end on the main frame, loosely, consisting of a standard supported fixedly on the main frame, and a connecting member connected to and between the standard and the harvester frame for longitudinal adjustments of the latter, and connecting devices, manually operable, between the middle part of the harvester frame and an adjacent part of the main frame, including a spring hanger depending from the main frame, the harvester having spaced side bars, an arch rigidly connecting said bars medially, a rock-arm mounted on the main frame, a hanger-rod adjustably connected to the outer member of the rock-arm with its lower part loosely connected to said arch, and the lower end of the spring hanger connected to said arch.

13. In a corn harvester, in combination, a main frame mounted for transportation, a tractor, a frame supported thereon close to its rear end tiltably, and adjustable longitudinally, consisting of a fixed standard on the tractor, and a rockbody secured on the standard and pivoted to said frame a short distance forward of its rear end for longitudinal tilting adjustments.

14. In combination, in a corn harvester, a main frame mounted for transportation, a harvester frame mounted pivotally thereon at a short distance in advance of its rear end to shorten the swing of said rear end in delivery, a rigid bracketed support on the main frame, the harvester frame including spaced side frame bars and an arch device end-connected on and across said side bars rigidly, and in advance of said mounting, a tension device connected between said bracketed support and arch, a hand lever mounted pivotally intermediate its ends on said bracketed support, and linking connections between said lever and said arch, including a rockbody linked to said arch and operable for adjusting lengthwise the harvester frame relative to the main frame.

15. In combination, a tractor, a harvester supported a short distance in advance of its rear end to and alongside the tractor to shorten the swing thereof, and also connected at or near its middle part with the tractor loosely, the connection including tension and adjustable hanger means connected between the tractor and middle of the harvester and operable manually to limit downward movements of the harvester relative to the tractor.

16. In a corn harvester combination, a pair of laterally spaced harvester frames, mechanisms thereon for treating plants, a tractor positioned between said frames, a beam rigidly mounted on and above the tractor, to project at its ends above the harvester frames, connecting devices between the beam and the harvester frames, and mechanism mounted on the beam, comprising a hand lever mounted rockably medially adjustably on the beam, bell-crank levers pivotally mounted on the frame near its ends, connecting rods between the inner arms of the bell-crank levers and opposite parts of the hand lever equidistant from its pivot, vertically disposed hanger-rods with their upper ends adjustably threaded into the outer arms of the bell-crank levers, rigid arches mounted on the frames having transverse lugs thereon, the lugs being apertured with the hanger-rods traversing certain of the apertures and having stop-heads below the lugs, depending hooks having threaded stems adjustably traversing the beam ends, and spring hangers hung on said hooks with their lower ends traversing and secured in other apertures of said lugs, whereby the harvester frames are adjustably resiliently hung on said beam for limited play relative thereto.

HENRY J. KUHLMAN.